United States Patent Office 3,477,985
Patented Nov. 11, 1969

3,477,985
VULCANIZABLE COMPOSITIONS
Giovanni Bucci, Ferrara, Tonino Simonazzi, Bologna, and Giuliano Ballini and Augusto Portolani, Ferrara, Italy, assignors to Montecatini Edison S.p.A., Milan, Italy
No Drawing. Filed July 22, 1963, Ser. No. 296,469
Claims priority, application Italy, July 23, 1962, 14,722/62
Int. Cl. C08f 27/00, 27/22
U.S. Cl. 260—41                                      13 Claims This invention relates to vulcanizable compositions comprising an olefinic polymer or a saturated copolymer of ethylene with an alpha-olefin, a reinforcing filler and an organic peroxide having particular characteristics.

The use of organic percompounds as cross-linking agents for olefinic polymers and for copolymers of ethylene with alpha-olefins is known. The use of monoperoxides, such as dicumyl peroxide, di-tert.butyl peroxide and tert.butyl cumyl peroxide, as well as the use of diperoxides, in the vulcanization of said olefin polymers or copolymers is also known.

The behavior of diperoxides is similar to that of monoperoxides of the di(aryl)alkyl or alkyl-(aryl)-alkyl type (e.g. dicumyl peroxide, tert. butyl cumyl peroxide). However, the vulcanizing effectiveness keeping a parity of the molar concentration of the peroxides is twice as high with respect to diperoxides when compared to not only the aforementioned monoperoxides but also the bis(alkylperoxy)alkanes known in the literature (U.S. Patent No. 2,916,481).

All mono- and di-peroxides have a vulcanization rate which is almost identical with the thermal decomposition rate in a solvent. This is reported in the literature (see e.g., Dohenert, Modern Plastics 36 (6) 142, 1959). Thus, dicumyl peroxide which has a half life (semidecomposition period) of 0.05 hour at 165° C., vulcanizes at this temperature within 25 to 30 minutes. The vulcanization time therefore can be considered to be about 10 times the half life (see Rubber Age, February 1962, page 805).

Dicumyl peroxide is more rapid than the dialkyldi(aryl)alkyl and alkyl(arylalkyl)peroxides known till now. Other classes of percompounds have lower values of half-life e.g., dibenzoyl peroxide has a half life of 0.05 hour at 121° C. and tert.butylperbenzoate has the same half-life at 153° C.

The prior diacyl peroxides and also, although to a lower extent, the alkyl peresters have the inconvenience of being influenced by carbon black reinforcing fillers which reduce their vulcanizing activity, and therefore these peroxides have a very limited use in the vulcanization of natural or synthetic elastomeric substances.

An object of this invention is a vulcanizable composition of olefinic polymers or copolymers, containing a reinforcing filler and a peroxide which has a very high vulcanization rate and is not at all, or at most scarcely, influenced by reinforcing fillers, more particularly by carbon black fillers.

The vulcanizable compositions according to this invention are characterized in that, together with the olefinic polymer and/or copolymer and the relative reinforcing filler, they contain a tetraperoxide having the formula

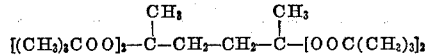

[2,2,5,5-tetra(tert.butylperoxy)hexane] which has a high vulcanization rate that is not reduced by the presence of the reinforcing fillers.

Said tetraperoxide can be obtained from acetonylacetone and tert.butylhydroperoxide, according to the method described in the U.S. Patent No. 2,455,569 or by the method of Dickey et al. in the J.A.C.S. 71 (1949), p. 1432, for the synthesis of bis(butyl-peroxy)alkanes from carbonyl compounds and tert.butyl-hynroperoxide.

This tetraperoxide is a crystalline solid having a melting point of 66–67° C. (recrystallized from methanol) and has the following composition:

|   | Percent |
|---|---|
| C | 60.9 |
| H | 10.8 |
| O | 28.3 |

Its molecular weight (measured with a vapor pressure Osmometer, mod. 301 A., Mechrolab. California) is 434+1.

The composition, calculated for $C_{22}H_{46}O_8$ is:

|   | Percent |
|---|---|
| C | 60.24 |
| H | 10.57 |
| O | 29.18 |

The molecular weight calculated from the above formula is 438.61.

The structure of the peroxide was demonstrated by hydrogenation at 25° C. in the presence of Raney Ni with an initial $H_2$ pressure of 100 atm.: hexanediol-2,5 was obtained in practically quantitative yields. Moreover, by treatment with concentrated hydrochloric acid, acetonyl acetone and tert.butylhydroperoxide were obtained.

The advantages offered by the use of 2,2,5,5-tetra(tert.-butylperoxy)hexane(2,2,5,5-TBPH) in the vulcanization of olefinic polymers or copolymers, more particularly of ethylene-alpha-olefins copolymers are:

(1) shorter vulcanization periods than heretofore required at the same temperature (at 165° C. 10 minutes instead of 30), or lower temperatures for the same vulcanization period (25 minutes at 150° C. instead of at 165° C.).

(2) the ability to use mixes containing carbon black without influencing the vulcanization efficiency.

(3) the drastic reduction of the vulcanization product odors, as compared with those vulcanized with peroxides containing aryl groups. The weak initial odor disappears rapidly with time.

(4) manufactured articles not showing either blisters or scorching.

The vulcanization of olefinic polymers or copolymers with the tetraperoxide of this invention is preferably carried out in the presence of basic substances selected from the group consisting of metal oxides, amines and diphenylguanidine (e.g., MgO, diphenylguanidine (DPG), MgO+DPG) which improve its effectiveness. The effectiveness corresponds to one half of the number of peroxidic groups present in the molecule; thus 2,2,5,5-TBPH used in the same molar concentration as dicumyl peroxide has only a double and not a quadruple effectiveness.

The vulcanization effectiveness of the tetraperoxide according to this invention can be increased by having present in the mix such auxiliary substances as sulfur, quinonic compounds, vinyl and divinyl monomers, allyl and polyallyl monomers, polymers containing vinylic unsaturations, dimaleimides, furfural and derivatives.

The amount of tetraperoxide contained in the vulcanizable compositions according to this invention is between 1 and 8 parts by weight per 100 parts of olefinic polymer or copolymer. The amount of basic and/or auxiliary substances present in the same mixes can be between 0.1 and 10 parts by wegiht per 100 parts of polymer or copolymer.

If sulfur is used as the auxiliary substance for the vulcanization, it will be present in the compositions according to this invention in an amount from 0.2 to 4, preferably from 0.3 to 1, parts by weight per 100 parts of polymer or copolymer.

The compositions of this invention may also contain the additives, plasticizers and antioxidants commonly used in the rubber industry, provided that they do not interfere with the tetraperoxide.

The fillers which may be used in the compositions according to the present invention comprise all types of carbon black, which are normally added to the polymer or copolymer in amounts between 10 and 100 parts by weight per 100 parts of polymer or copolymer. Also the white fillers of the acid type, such as silica, clay, talc, litopone and the like, which could interfere with the peroxide, may be used together with corrective basic additives.

The admixtures of polymers or copolymers with 2,2,5,5-TBPH and possibly with the aforementioned or with other auxiliary substances can be prepared with the apparatuses normally used for mechanical mixing in the rubber industry.

It will be preferable to avoid having the mix reach temperatures higher than 120° C., in order to avoid a premature decompositions of the peroxide.

The vulcanization of the mix, as well as its preparation can be carried out in a common rubber industry apparatus which is suitable for heating and shaping. In case of extrusion it will be convenient to operate at temperatures as low as possible, compatible with the plasticity of the mix and with the form of the manufactured article to be prepared.

The tetraperoxide in question is also suitable for the covulcanization of mixtures of saturated ethylene-alpha-olefin copolymers with other saturated or unsaturated elastomers, without any limits but those established by the possibility of these other elastomers being vulcanized with an organic peroxide. It can also be used in admixture with other peroxides and can be added to the mix in the pure state or wetted with water or dissolved in solvents or diluted with inert mineral substances.

Particularly advantageous results are obtained by using the tetraperoxide, 2,2,5,5-TBPH, in the vulcanization of saturated amorphous copolymers of ethylene with propylene and/or butene. The advantageous results are obtained when the copolymers utilized preferably have an ethylene molar content of between 20 and 80% and a molecular weight higher than 60,000 and preferably between 100,000 and 600,00.

The following examples are presented to further illustrate the invention without limiting its scope.

Example 1

The mixes reported in Table 1 were prepared in a roll mixer from an ethylene-propylene copolymer containing 45 mols percent of propylene and having a Mooney viscosity of 22 ML (1+4) 100° C.

These mixes were then vulcanized in a steam press into 120 x 120 x 2 mm. C-type plates (ASTM D 412) which were subjected to tensile tests in an Amsler type dynamometer with a rate of separation of the grips of 500 mm./minute, for the determination of tensile strength, elongation at break, and modulus at 200 and at 300% elongation.

The residual elongation was determined on special specimens having a useful portion of 5 cm., kept under tension at 200% elongation for 1 hour and measured 1 minute after release.

TABLE 1

| Mixes | A | B | C | D | E | F | G |
|---|---|---|---|---|---|---|---|
| Ethylene-propylene copolymer, g | 100 | 100 | 100 | 100 | 100 | 100 | 100 |
| HAF* carbon black, g | 50 | 50 | 50 | 50 | 50 | 50 | 50 |
| Sulfur, g | 0.3 | 0.3 | 1.2 | 0.3 | 0.3 | 0.3 | 1.2 |
| 2,2,5,5-TBPH, mols | 0.005 | 0.005 | 0.01 | 0.0065 | 0.0065 | 0.0065 | 0.0113 |
| MgO, g | 5 | 2 | 2 | | 5 | 2 | 2 |
| Diphenylguanidine, g | | 1 | 1 | | | 1 | 1 |
| Vulcanization conditions: | | | | | | | |
| ° C. | 150 | 150 | 150 | 165 | 165 | 165 | 165 |
| Minutes | 30 | 30 | 30 | 30 | 30 | 30 | 30 |
| Tensile strength, kg./cm.² | 130 | 120 | 152 | 143 | 155 | 169 |
| Elongation at break, percent | 330 | 430 | 400 | 470 | 360 | 343 | 328 |
| Modulus at 200%, kg./cm.² | 74 | | | | | | 89 |
| Modulus at 300%, kg./cm.² | 119 | 82 | 110 | 74 | 117 | 129 | 159 |
| Residual elongation at 200% (1 minute), percent | 13 | 18 | 10 | 20 | 12 | 11 | 7.5 |

*HAF is High Abrasion Furnace.

Example 2

A mix is prepared with an ethylene-propylene copolymer having a propylene molar content of 45% and a Mooney viscosity of 45 ML (1+4) 100° C. This mix is then vulcanized for different periods at 145° C. and at 165° C.

The characteristics are reported in the following table:

Composition of the mix:
Ethylene-propylene _____ g.___ 100
HAF carbon black _____ g.___ 50
Sulfur _____ g.___ 0.3
2,2,5,5-TBPH (mols) _____ 0.00625

| Vulcanization time (minutes) | Tensile strength, kg./cm.² | Elongation at break, percent | Modulus at 300%, kg./cm.² | Residual elongation percent |
|---|---|---|---|---|
| Temp., 145° C.: | | | | |
| 5' | 74 | 640 | 30 | 26 |
| 10' | 110 | 475 | 74 | 14 |
| 15' | 131 | 430 | 92 | 11 |
| 20' | 140 | 390 | 100 | 10.5 |
| 25' | 141 | 375 | 102 | 10 |
| 30' | 142 | 370 | 103 | 9.5 |
| 35' | 142 | 370 | 103 | 9.5 |
| Temp., 165° C.: | | | | |
| 5' | 151 | 450 | 84 | 12 |
| 10' | 147 | 380 | 102 | 10 |
| 15' | 145 | 375 | 107 | 8.5 |
| 20' | 145 | 370 | 107 | 8.5 |

The scorching time was determined according to ASTM D 1646.

The Mooney values are reported below together with the values obtained with dicumylperoxide (P.C.) used for comparison.

| | Scorch time (minutes) | |
|---|---|---|
| | 2,2,5,5-TBPH | P.C. |
| Temperature, ° C.: | | |
| 125 | 13.25 | |
| 145 | 4.00 | 5.00 |
| 155 | 2.50 | 3.35 |
| 165 | 1.75 | 2.25 |
| 175 | | 1.50 |

The variation in the shear modulus by varying the vulcanization time was continuously determined by means of a curometer.

The percentages of the maximum value of this modulus, measured at different periods, are reported below for 2,2,5,5-TBPH and for dicumyl peroxide (P.C.) used for comparison.

| | Percent of the maximum value of shear modulus | | | | | | | |
|---|---|---|---|---|---|---|---|---|
| | 145° C. | | 155° C. | | 165° C. | | 175° C. | |
| | 2,2,5,5-TBPH | P.C. | 2,2,5,5-TBPH | P.C. | 2,2,5,5-TBPH | P.C. | 2,2,5,5-TBPH | P.C. |
| Time, minutes | | | | | | | | |
| 2' | 37 | | 49.5 | | 56.5 | | n.d. | 29 |
| 4' | 63 | 16.5 | 83 | 22.5 | 93 | 32.5 | n.d. | 69 |
| 6' | 80 | 20 | 94 | 33.5 | 99 | 51 | 100 | 88.5 |
| 8' | 89 | 27.5 | 97 | 46.5 | 99.5 | 70 | | 95 |
| 10' | 94 | 33 | 98.5 | 57 | 100 | 81 | | 98 |
| 12' | 97 | 39 | 99.5 | 66 | | 88 | | 99 |
| 14' | 98.5 | 43.5 | 100 | 73 | | 93 | | 99.5 |
| 16' | 99.5 | 48.5 | | 78.5 | | 95.5 | | 100 |
| 18' | 100 | 53.5 | | 82.5 | | 97 | | |
| 20' | | 57.5 | | 85 | | 98 | | |
| 22' | | 61.5 | | 88.5 | | 99 | | |
| 24' | | 65 | | 91 | | 99.5 | | |
| 26' | | 68 | | 93 | | | | |
| 28' | | 71 | | 94 | | 100 | | |
| 30' | | 74 | | 95 | | | | |
| 35' | | 78.5 | | 96.5 | | | | |
| 40' | | 83 | | 98 | | | | |
| 45' | | 86 | | 98.5 | | | | |
| 50' | | 89 | | 99 | | | | |
| 55' | | 91.5 | | 99.5 | | | | |
| 60' | | 93.5 | | 100 | | | | |
| 65' | | 95.0 | | | | | | |
| 70' | | 96.5 | | | | | | |
| 75' | | 98.0 | | | | | | |
| 80' | | 99.0 | | | | | | |
| 85' | | 99.8 | | | | | | |
| 90' | | 100 | | | | | | |

Example 3

A mix was prepared with an ethylene-propylene copolymer having a propylene molar content of 45%, a Mooney viscosity of 20 ML (1+4) at 100° C., and the following composition (1):

| | | |
|---|---|---|
| Ethylene-propylene copolymer | g | 100 |
| HAF carbon black | g | 50 |
| Sulfur | g | 0.8 |
| Diphenylguanidine | g | 1 |
| 2,2,5,5-TBPH (mols) | | 0.013 |

One part of the mix was passed twice throughout a screw-extruder wherein the head and the body were maintained at temperatures of 100° C. and 90° C., respectively. 120 x 120 x 2 mm. plates were prepared by vulcanizing extruded and unextruded mix samples in a steam press at 150° C. for 40 minutes.

The following mechanical characteristics were determined on those plates according to the method described in Example 1.

| Mechanical characteristics | Unextruded mix | Extruded mix |
|---|---|---|
| Tensile strength, kg./cm.² | 153 | 143 |
| Elongation at break, percent | 340 | 350 |
| Modulus at 300%, kg./cm.² | 125 | 127 |
| Residual elongation at 200% (1'), percent | 8 | 8 |
| Mooney viscosity ML (1+4) at 100° C | 39 | 38 |

The above data show that during the hot-drawing (extrusion) the mixes did not suffer any scorching, since the vulcanized articles of the extruded mix show characteristics comparable to those of the unextruded mix.

If, on the other hand tert.butyl perbenzoate is used in the starting composition (1) instead of 2,2,5,5-TBPH, and an extruded mix and an unextruded mix are prepared from said composition and are thereafter vulcanized as above, the characteristics of the articles obtained from the extruded mix are not at all comparable with those of the articles obtained from the unextruded mix because of a strong scorching due to the premature decomposition of said perbenzoate occurring during the extrusion step.

Examples 4–6

Using an ethylene-propylene copolymer having a Mooney viscosity of 35 ML (1+4) 100° C., three mixes and the vulcanizates thereof were prepared.

The characteristics are reported in the following table:

| Composition of the mix: | Pts./wt. | Pts./wt. | Pts./wt. |
|---|---|---|---|
| Ethylene-propylene copolymer | 100 | 100 | 100 |
| HAF carbon black | 50 | 50 | 50 |
| 2,2,5,5-TBPH | 1.82 | 1.82 | 2.43 |
| Dibenzoyl quinonedioxime | 1.8 | | |
| Triallyl cyanurate | | 2.0 | |
| Difurfuraldazine | | | 0.6 |
| Vulcanization in press: 150° C./40 minutes | | | |
| Tensile strength, kg./cm.² | 152 | 126 | 156 |
| Elongation at break, percent | 300 | 305 | 320 |
| Modulus at 200%, kg./cm.² | 86 | 70 | 76 |
| Residual elongation, percent | 10.5 | 14 | 12 |
| ISO hardness | 68 | 65 | 65 |

What is claimed is:

1. Vulcanizable compositions containing polymers selected from the group consisting of olefinic homopolymers, saturated copolymers of ethylene with an alpha-olefin and mixtures thereof with a reinforcing filler and, as a vulcanization agent, the tetraperoxide, 2,2,5,5-tetra-(tert.butylperoxy)hexane, having the formula

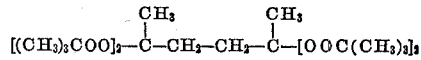

2. The vulcanizable compositions of claim 1 which also contain a basic substance.

3. The vulcanizable compositions of claim 2 wherein the basic substance is selected from the group consisting of metal oxides, amines and diphenylguanidine and is present in amounts of from 0.1 to 10 parts by weight per 100 parts of polymer.

4. The vulcanizable compositions of claim 1 wherein the tetraperoxide is present in an amount of from 1 to 10 parts by weight per 100 parts of polymer.

5. The vulcanizable compositions of claim 1 which also contain an auxiliary vulcanization agent, acting as a free-radical acceptor, selected from the group consisting of sulfur, quinonic compounds, compounds containing at least one vinyl group, compounds having at least one allyl group, polymers containing vinyl unsaturations, dimaleimides and furfural, in an amount of from 0.1 to 10 parts by weight per 100 parts of polymer.

6. The vulcanizable compositions of claim 5 wherein sulfur is present in an amount of from 0.1 to 4 parts by weight per 100 parts of polymer.

7. The vulcanizable compositions of claim 5 wherein sulfur is present in an amount of from 0.3 to 1 parts by weight per 100 parts of polymer.

8. The vulcanizable compositions of claim 1 wherein the reinforcing filler is carbon black.

9. The vulcanizable compositions of claim 1 wherein the polymer is a saturated amorphous ethylene-propylene copolymer having an ethylene molar content between 20 and 80% and a molecular weight higher than 60,000.

10. The vulcanizable compositions of claim 1 wherein the polymer is a saturated amorphous ethylene-propylene copolymer having an ethylene molar content between 20 and 80% and a molecular weight of from about 100,000 to about 600,000.

11. A product having the formula

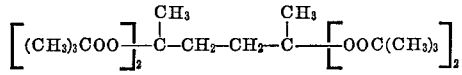

and a melting point of 66°–67° C., after recrystallization from methanol.

12. 2,2,5,5-tetra-tert. butylperoxyhexane.

13. A vulvanizable composition comprising a copolymer of ethylene with another alpha-olefin and, as a vulcanization agent, 2,2,5,5-tetra-tert. butylperoxyhexane.

References Cited

UNITED STATES PATENTS 2,916,481  12/1959  Gilmont _____ 260—610

MORRIS LIEBMAN, Primary Examiner

J. S. WALDRON, Assistant Examiner